US011055496B2

(12) United States Patent
Lee et al.

(10) Patent No.: US 11,055,496 B2
(45) Date of Patent: Jul. 6, 2021

(54) METHOD AND APPARATUS WITH SENTENCE MAPPING

(71) Applicant: SAMSUNG ELECTRONICS CO., LTD., Suwon-si (KR)

(72) Inventors: Jihyun Lee, Suwon-si (KR); Hwidong Na, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 16/371,949

(22) Filed: Apr. 1, 2019

(65) Prior Publication Data

US 2020/0073948 A1  Mar. 5, 2020

(30) Foreign Application Priority Data

Aug. 31, 2018 (KR) ........................ 10-2018-0103655

(51) Int. Cl.
| | | |
|---|---|---|
| *G06F 40/00* | (2020.01) | |
| *G06F 40/51* | (2020.01) | |
| *G06F 40/35* | (2020.01) | |
| *G06F 40/289* | (2020.01) | |

(52) U.S. Cl.
CPC ............ *G06F 40/51* (2020.01); *G06F 40/289* (2020.01); *G06F 40/35* (2020.01)

(58) Field of Classification Search
None
See application file for complete search history.

(56) References Cited

U.S. PATENT DOCUMENTS

| | | | |
|---|---|---|---|
| 7,752,034 B2 | 7/2010 | Brockett et al. | |
| 8,296,127 B2 | 10/2012 | Marcu et al. | |
| 8,600,729 B2* | 12/2013 | Yang | G06F 40/284 |
| | | | 704/2 |
| 8,874,431 B2 | 10/2014 | Abir | |
| 9,311,293 B2* | 4/2016 | DeNero | G06F 40/45 |
| 2003/0149686 A1* | 8/2003 | Drissi | G06F 16/3337 |
| 2009/0164208 A1 | 6/2009 | Dengjun et al. | |

(Continued)

FOREIGN PATENT DOCUMENTS

| | | |
|---|---|---|
| JP | 2000-20524 A | 1/2000 |
| JP | 2005-165612 A | 6/2005 |

(Continued)

OTHER PUBLICATIONS

M. Mohaghegh and A. Sarrafzadeh, "Parallel Text Identification Using Lexical and Corpus Features for the English-Maori Language Pair," 2016 15th IEEE International Conference on Machine Learning and Applications (ICMLA), Anaheim, CA, 2016, pp. 910-915, doi: 10.1109/ICMLA.2016.0163. (Year: 2016).*

(Continued)

*Primary Examiner* — Edgar X Guerra-Erazo
(74) *Attorney, Agent, or Firm* — NSIP Law (57) ABSTRACT

A sentence mapping method includes obtaining a source language document in a source language and a target language document in a target language, wherein the target language document is a translation of the source language document, generating a translated document by translating the target language document into the source language, and mapping source language sentences in the source language document and target language sentences with the target language document by comparing the source language document and the translated document.

26 Claims, 9 Drawing Sheets

(56) References Cited

U.S. PATENT DOCUMENTS

| | | | |
|---|---|---|---|
| 2009/0326911 A1* | 12/2009 | Menezes | G06F 40/55 704/2 |
| 2010/0076746 A1* | 3/2010 | Aikawa | G06F 40/289 704/3 |
| 2013/0275118 A1* | 10/2013 | DeNero | G06F 40/30 704/3 |
| 2016/0092437 A1 | 5/2016 | Endo et al. | |

FOREIGN PATENT DOCUMENTS

| | | | | |
|---|---|---|---|---|
| JP | 2005-202509 A | 7/2005 | | |
| JP | 2010-9237 A | 1/2010 | | |
| KR | 10-2005-0034688 A | 4/2005 | | |
| KR | 10-2013-0042839 A | 4/2013 | | |
| KR | 10-1517975 B1 | 5/2015 | | |
| WO | WO-2005033967 A2 * | 4/2005 | ........... | G06F 3/0237 |

OTHER PUBLICATIONS

Gale, William A., et al. "A Program For Aligning Sentences In Bilingual Corpora." *Computational Linguistics* 19.1 (1993): 75-102. (28 pages, in English).

Varga, Dániel, et al. "Parallel Corpora For Medium Density Languages." *Amsterdam Studies In The Theory And History Of Linguistic Science Series 4* 292 (2007): 247. (7 pages, in English).

Sennrich, Rico, et al. "MT-Based Sentence Alignment For OCR-Generated Parallel Texts." *The Ninth Conference of the Association for Machine Translation in the Americas (AMTA 2010)*. 2010. (10 pages, in English).

\* cited by examiner

METHOD AND APPARATUS WITH SENTENCE MAPPING

CROSS-REFERENCE TO RELATED APPLICATIONS

This application claims the benefit under 35 USC 119(a) of Korean Patent Application No. 10-2018-0103655 filed on Aug. 31, 2018, in the Korean Intellectual Property Office, the entire disclosure of which is incorporated herein by reference for all purposes.

BACKGROUND

1. Field

The following description relates to a method and apparatus with sentence mapping.

2. Description of Related Art

A parallel corpus is used in application services, such as machine translation and cross-language information retrieval. A sentence-unit parallel corpus may be a set of pairs of units of original text and units of translated texts. In a typical sentence mapping method or apparatus, a large and high-quality parallel corpus is required for sentence mapping, and therefore a high performance of such a sentence mapping method or apparatus is required to perform sentence mapping using the large and high-quality parallel corpus.

For example, a length-based sentence mapping method may map similar sentences by comparing the numbers of words or letters in the sentences that are mapped. A performance of a typical sentence mapping method is degraded with respect to atypical documents or languages with large differences in linguistic characteristics. As another example, a lexicon-based sentence mapping method may map words using a predefined lexical rule and a word translator. Such a lexicon-based sentence mapping method needs to be used along with the length-based sentence mapping method because its mapping performance depends on the qualities of the lexical rule and a translation performance of the word translator. Also, a lexicon-based sentence mapping method is extremely slow in speed.

As still another example, a machine translation-based sentence mapping method may translate a sentence in a source text using a forward translator and discover a sentence in a target text that is most similar to the translated sentence. Such a sentence mapping method may have a circular dependency, and its mapping performance may depend on a performance success level of the translator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented sentence mapping method includes obtaining a source language document in a source language and a target language document in a target language, wherein the target language document is a translation of the source language document, generating a translated document by translating the target language document into the source language, and mapping source language sentences in the source language document with target language sentences in the target language document by comparing the source language document and the translated document.

The generating of the translated document may include generating translated sentences by translating each of the target language sentences in the target language document into the source language, one or more of the translated sentences corresponding to one or more respective target language sentences of the target language sentences.

The mapping of the source language sentences with the target language sentences may include determining similarities between the source language sentences and translated sentences in the translated document, mapping the source language sentences with the translated sentences based on the similarities, and mapping the source language sentences with target language sentences of the target language sentences respectively corresponding to the mapped translated sentences.

The mapping of the source language sentences and the target language sentences may include identifying a source language sentence of the source language sentences, determining a similarity between the identified source language sentence and each of translated sentences in the translated document, and mapping the identified source language sentence and a translated sentence of the translated sentences having a greatest similarity among the determined similarities.

The determining of the similarity may include identifying a translated sentence of the translated sentences, and determining a similarity between the identified source language sentence and the identified translated sentence based on an importance level of at least one word commonly included in the identified source language sentence and the identified translated sentence.

The determining of the similarity may include extracting the at least one word commonly included in the identified source language sentence and the identified translated sentence using either one or both of a synonym dictionary and a thesaurus of the source language.

A word included in the identified translated sentence that is a synonym of a word included in the identified source language sentence is determined to be the commonly included word.

The importance level of the at least one word may be calculated based on a term frequency-inverse document frequency (TF-IDF) of the at least one word.

The determining of the similarity may include identifying a translated sentence of the translated sentences, and determining a similarity between the identified source language sentence and the identified translated sentence based on a position of the identified source language sentence in the source language document and a position of the identified translated sentence in the translated document.

The determining of the similarity may include identifying a translated sentence of the translated sentences, and determining a similarity between the identified source language sentence and the identified translated sentence based on a probability of the identified source language sentence being generated when a target language sentence corresponding to the identified translated sentence is translated into the source language.

The generating of the translated document may include generating a plurality of translated documents by translating the target language document into the source language by each of a plurality of translators, and the determining of the similarity may include identifying a translated sentence of the translated sentences for each of the translated documents, determining a similarity between the identified source language sentence and each of the identified translated sentences for each of the translated documents, and determining a similarity between the identified source language sentence and the identified translated sentence based on the determined similarities.

The mapping of the source language sentences and the target language sentences may include in response to a first source language sentence and a second source language sentence being mapped to a same translated sentence in the translated document, integrating the first source language sentence and the second source language sentence to form a single source language sentence, and mapping the single source language sentence with the translated sentence.

The first source language sentence and the second source language sentence may be in succession in the source language document.

The mapping of the source language sentences and the target language sentences may include in response to a first translated sentence and a second translated sentence in the translated document being mapped to a same source language sentence of the source language sentences, integrating the first translated sentence and the second translated sentence to form a single translated sentence, and mapping the single sentence and the source language sentence.

The first translated sentence and the second translated sentence may be in succession in the translated document.

In another general aspect, a non-transitory computer-readable storage medium stores instructions that, when executed by one or more processors, cause the one or more processors to perform the method described above.

In another general aspect, a sentence mapping apparatus includes one or more processors configured to obtain a source language document in a source language and a target language document in a target language, wherein the target language document, wherein the target language document is a translation of the source language document, generate a translated document by translating the target language document into the source language, and map source language sentences in the source language document with target language sentences in the target language document by comparing the source language document and the translated document.

The one or more processors may be further configured to identify a source language sentence of the source language sentences, determine a similarity between the identified source language sentence and each of translated sentences in the translated document, and map the identified source language sentence and a translated sentence having a greatest similarity among the determined similarities.

The one or more processors may be further configured to identify a translated sentence of the translated sentences, and determine a similarity between the identified source language sentence and the identified translated sentence based on an importance level of at least one word commonly included in the identified source language sentence and the identified translated sentence.

The processor may be further configured to identify a translated sentence of the translated sentences, and determine a similarity between the source language sentence and the identified translated sentence based on a position of the source language sentence in the source language document and a position of the translated sentence in the translated document.

The processor may further configured to translate the target language document into the source language by each of translators, and generate translated documents respectively corresponding to the translators, identify one of the translated sentences, determine a similarity between the source language sentence and the identified translated sentence for each of the translators, and determine a similarity between the source language sentence and the translated sentence based on the similarity determined for each of the translators.

In another general aspect, a processor-implemented sentence mapping method includes obtaining a source language document including sentences in a source language, obtaining a target language document including sentences in a target language, wherein the target language document is a translation of the source document in the target language, translating the target language document into a translated document including sentences in the source language, mapping the sentences in the source language document with the sentences in the target language document by comparing the source language document and the translated document, and constructing a training database using a result of the mapping between the sentences in the source language document with the sentences in the target language document.

The method may further include training a translator using the training database.

The method may further include generating a parallel corpus using the training database.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Figure 1:
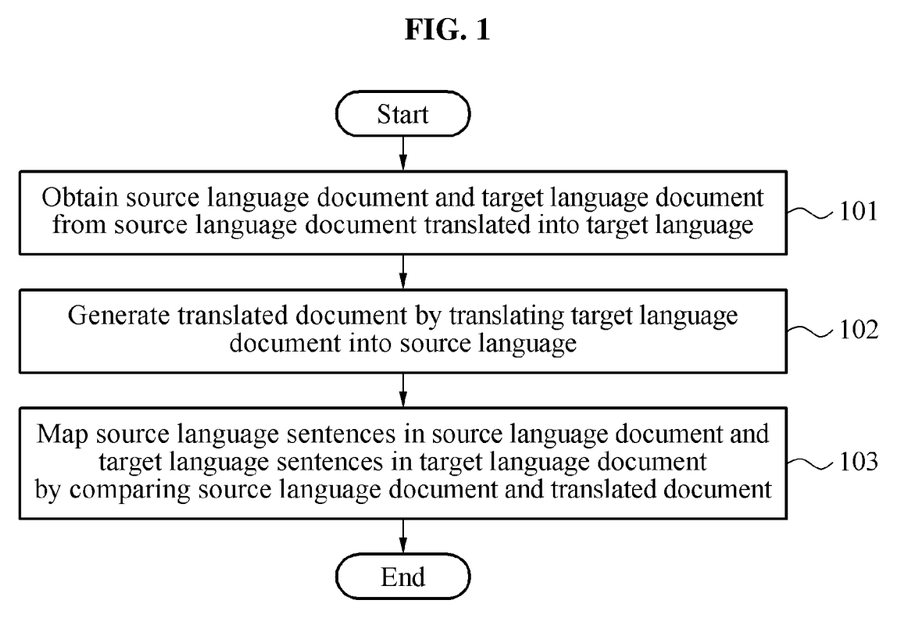
FIG. 1 is a flowchart illustrating an example of a sentence mapping method.

FIG. 1 is a flowchart illustrating an example of a sentence mapping method.

Referring to the example of FIG. 1, in operation 101, a sentence mapping apparatus may obtain a source language document and a target language document from the source language document translated into a target language. The sentence mapping apparatus may be configured to map sentences and embodied by, for example, a hardware module, or a module including both hardware and software (e.g., a processor being configured to execute instructions (e.g., a mobile phone)). The source language document may be an original text and the target language document may be a translated text obtained by translating the original text into the target language. In an example, the source language document and the target language document are generated in advance, stored in a memory, and obtained by the sentence mapping apparatus. The sentence mapping apparatus may generate a mapping relationship between a sentence in the source language document and a sentence in the target language document. A sentence-unit parallel corpus of the source language document and the target language document, which are expressed in different languages, may be a significant resource for various application services. For example, such a corpus may be used in machine translation and cross-language information retrieval. Thus, it may be advantageous to generate the parallel corpus (that is a set of sentence-unit original text-translated text pairs) from the source language document and the target language document. Accordingly, the sentence mapping apparatus may discover (or generate) such a parallel corpus by processing the source language document and the target language document.

In operation 102, the sentence mapping apparatus generates a translated document by translating the target language document into a source language. Although the target language document is a translated document of the source language document, the translated document described herein is one that is generated by the sentence mapping apparatus. That is, the translated document discussed here may be generated by translating the target language document into the source language using a backward translator. For example, the backward translator is a translator configured to translate a text from the target language into the source language. The sentence mapping apparatus may translate the target language document based on a sentence unit. Accordingly, the sentence mapping apparatus may translate each of the target language sentences in the target language document and generate translated sentences respectively corresponding to the target language sentences. Thus, the number of the target language sentences and the number of the translated sentences may be equal to one another, as in this example there is a one-to-one correspondence between the target language sentences and their corresponding generated translated sentences.

In operation 103, the sentence mapping apparatus may map source language sentences in the source language document and the target language sentences in the target language document by comparing the source language document and the translated document. In an example, the sentence mapping apparatus may extract, from the translated document, a translated sentence that is most similar to one of the source language sentences, and map the source language sentence with a target language sentence corresponding to the extracted translated sentence. The sentence mapping apparatus may determine such mapping using a similarity between a source language sentence and a translated sentence. Examples of such a mapping based on similarity are described in further detail hereinafter.

A parallel corpus may be generated based on a result of the mapping, and the generated parallel corpus may be used to train a forward translator. For example, such a forward translator is a translator configured to translate a text forwards from the source language to the target language. According to an example, by training the forward translator by using a parallel corpus generated based on the backward translator, a circular dependency, that may otherwise occur when training the forward translator using the parallel corpus generated based on the forward translator, is advantageously minimized.

Figure 2:
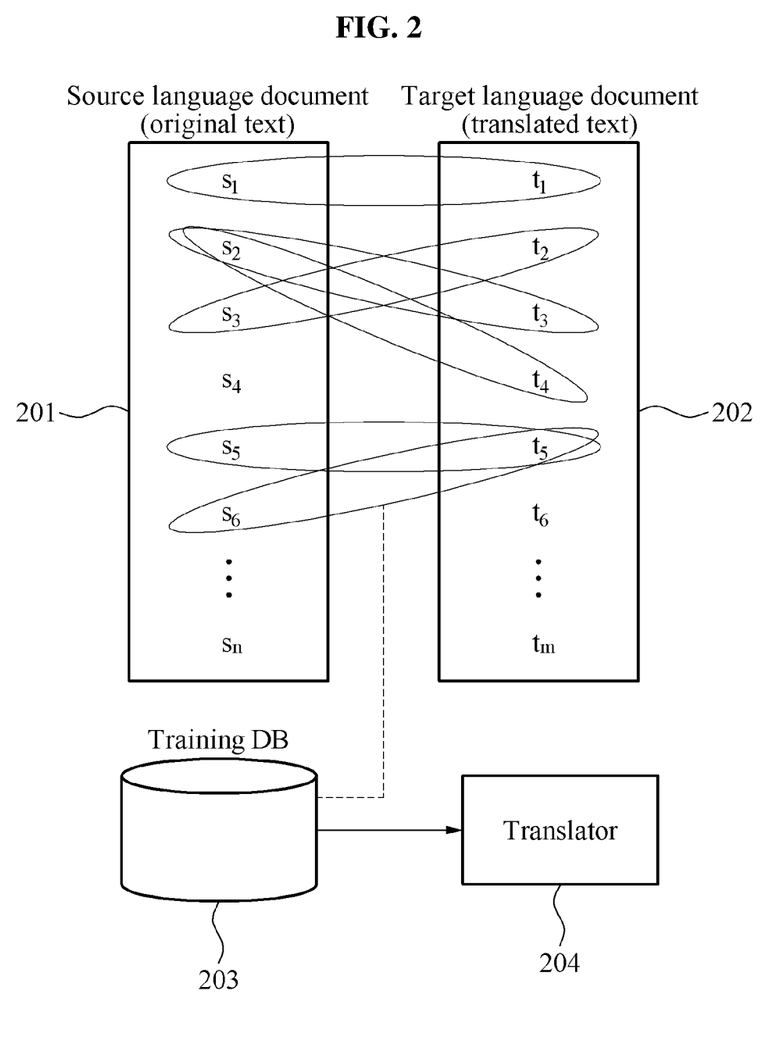
FIG. 2 is a diagram illustrating an example of a sentence mapping method.

FIG. 2 is a diagram illustrating an example of a sentence mapping method.

Referring to the example of FIG. 2, a source language document 201 corresponding to an original text may include n source language sentences, for example, $s_1, s_2, s_3, \ldots, s_n$. A target language document 202 corresponding to a translated text of the source language document 201 may include m target language sentences, for example, $t_1, t_2, t_3, \ldots, t_m$. The source language document 201 and the target language document 202 may be expressed in different languages, and thus the numbers of sentences included therein may or may not be equal. For example, expressing similar concepts in different languages may involve different numbers of sentences, depending on the grammatical characteristics of a given language.

In such an example the sentence mapping apparatus performs mapping between the source language sentences $s_1, s_2, s_3, \ldots, s_n$ in the source language document 201 and the target language sentences $t_1, t_2, t_3, \ldots, t_m$ in the target language document 202. In this example, the source language sentences $s_1, s_2, s_3, \ldots, s_n$ and the target language sentences $t_1, t_2, t_3, \ldots, t_m$ may not necessarily be matched one-to-one, and thus a plurality of sentences may be mapped to one sentence. For example, multiple different source sentences may be mapped to a given target sentence, and multiple different target sentences may be mapped to a given source sentence. The sentence mapping apparatus may construct a training database (DB) 203 using a result of the mapping between the source language document 201 and the target language document 202 to train a translator 204. A parallel corpus generated from such mapping by the sentence mapping apparatus may be used as training data to train the translator 204.

Figure 3:
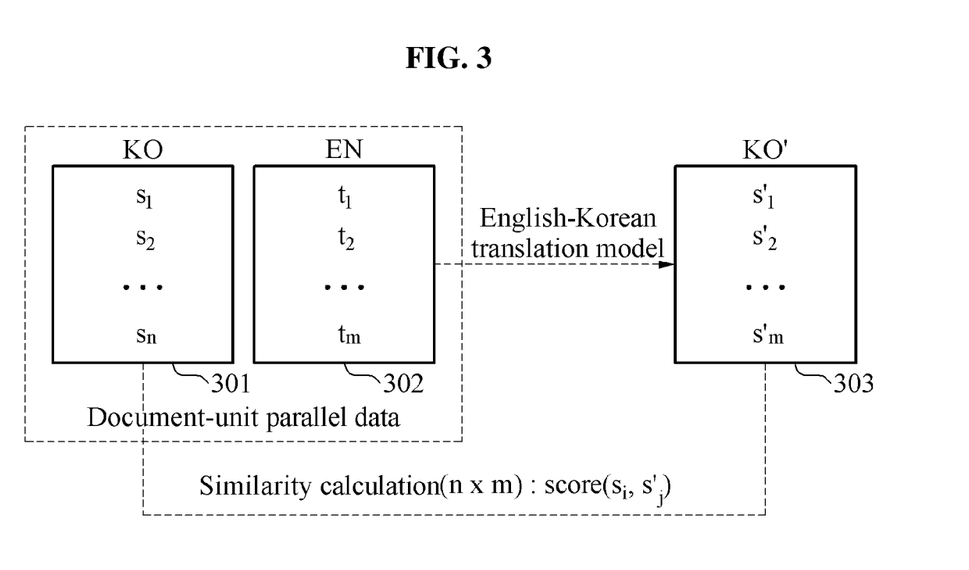
FIG. 3 is a diagram illustrating an example of a sentence mapping method.

FIG. 3 is a diagram illustrating an example of a sentence mapping method.

Referring to the example of FIG. 3, the sentence mapping apparatus may obtain a source language document 301 expressed in Korean and a target language document 302 expressed in English from the source language document 301. More specifically, the source language document 301 may include Korean sentences $s_1, s_2, s_3, \ldots, s_n$ and the target language document 302 may include English sentences $t_1, t_2, t_3, \ldots, t_m$. As illustrated in FIG. 3, the sentence mapping apparatus may map source language sentences $s_1, s_2, s_3, \ldots, s_n$ in the source language document 301 and target language sentences $t_1, t_2, t_3, \ldots, t_m$ in the target language document 302 to one another.

In an example, the sentence mapping apparatus translates the target language sentences $t_1, t_2, t_3, \ldots, t_m$ into Korean and generates a translated document 303 including translated sentences $s'_1, s'_2, s'_3, \ldots, s'_m$. The sentence mapping apparatus determines similarities between the source language sentences $s_1, s_2, s_3, \ldots, s_n$ and the translated sentences $s'_1, s'_2, s'_3, \ldots, s'_m$. Accordingly, the sentence mapping apparatus calculates a total of n×m similarities, in that each source language sentence is compared to a translated sentence to assess a similarity. Therefore, the sentence mapping apparatus determines a score, for example, score $(s_i, s'_j)$, which is associated with a similarity between a source language sentence, for example, $s_i$, and a translated sentence, for example, $s'_j$.

For example, the sentence mapping apparatus identifies the translated sentence $s'_j$, which is one selected translated sentence from among the translated sentences $s'_1, s'_2, s'_3, \ldots, s'_m$. The sentence mapping apparatus determines a similarity between the source language sentence $s_i$ and the translated sentence $s'_j$ based on a probability $P(s_i|MT_{eng-kor}, t_j)$ of the source language sentence $s_i$ being generated when a target language sentence $t_j$ corresponding to the translated sentence $s'_j$ is translated into the source language. How such a similarity is determined based on a probability is described in further detail, below.

The sentence mapping apparatus maps the source language sentences $s_1, s_2, s_3, \ldots, s_n$ and the translated sentences $S'_1, s'_2, s'_3, \ldots, s'_m$ based on the calculated similarities between the source language sentences $s_1, s_2, s_3, \ldots, s_n$ and the translated sentences $s'_1, s'_2, s'_3, \ldots, s'_m$. The sentence mapping apparatus maps the source language sentences and target language sentences respectively corresponding to the mapped translated sentences, where mapped sentences are chosen to be sentences that are similar to one another.

As another example, the sentence mapping apparatus identifies the source language sentence $s_i$, which is a selected sentence from among the source language sentences $s_1, s_2, s_3, \ldots, s_n$. The sentence mapping apparatus determines similarity scores, for example, score($s_i, s'_1$), score($s_i, s'_2$), score($s_i, s'_m$), between the identified source language sentence $s_i$ and each of the translated sentences $s'_1, s'_2, s'_3, \ldots, s'_m$, respectively. As a result, the sentence mapping apparatus maps the source language sentence $s_i$ and a translated sentence having a greatest similarity score from among the determined similarity scores.

When the source language sentence $s_i$ and the translated sentence $s'_j$ are mapped, the sentence mapping apparatus also maps the source language sentence $s_i$ and the target language sentence $t_j$ corresponding to the translated sentence $s'_j$. In such an example, mapping between a source language sentence and a corresponding target language sentence may be performed one-to-many, one-to-one, or many-to-many.

Figure 4:
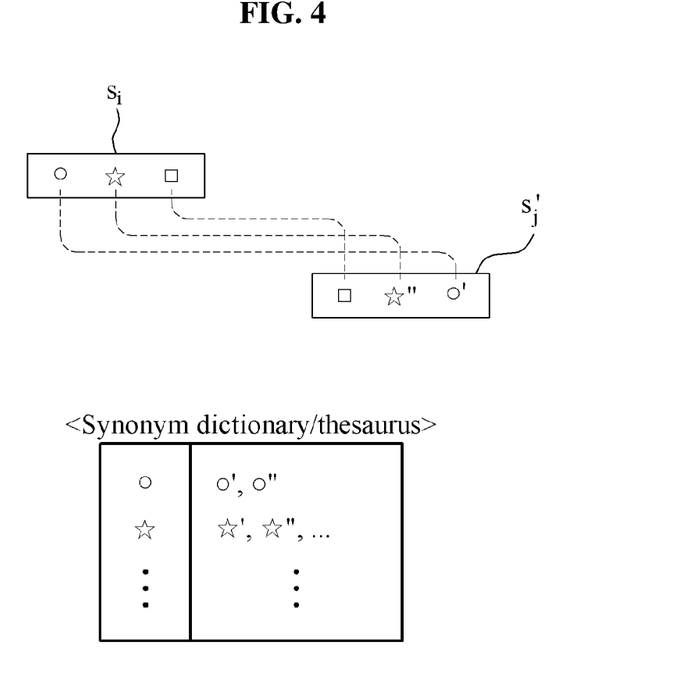
FIG. 4 is a diagram illustrating an example of how a similarity may be determined.

FIG. 4 is a diagram illustrating an example of how a similarity is determined.

Referring to the example of FIG. 4, the sentence mapping apparatus determines a similarity between a source language sentence $s_i$ and a translated sentence $s'_j$ based on an importance level of at least one word commonly included in the source language sentence $s_i$ and the translated sentence $s'_j$. In an example, the condition that "the at least one word is commonly included in the source language sentence $s_i$ and the translated sentence $s'_j$" may mean that the at least one word is included in the source language sentence $s_i$ and is also included in the translated sentence $s'_j$. In another example, the condition that "the at least one word is commonly included in the source language sentence $s_i$ and the translated sentence $s'_j$" may mean that the at least one word is included in the source language sentence $s_i$ and either one or both of the at least one word and a synonym of the at least one word is included in the translated sentence $s'_j$. In an example, the greater the number of words commonly included in the source language sentence $s_i$ and the translated sentence $s'_j$, the greater the similarity between the source language sentence $s_i$ and the translated sentence $s'_j$.

In an example, the sentence mapping apparatus extracts the at least one word commonly included in the source language sentence $s_i$ and the translated sentence $s'_j$, using a synonym dictionary or a thesaurus of a source language. Thus, to help identify commonly included words when assessing similarity, the sentence mapping apparatus may expand a range of common words using a synonym dictionary or a thesaurus. In this example, words, such as, for example, the same or similar words, whether or not exactly the same, in the source language sentence $s_i$ and the translated sentence $s'_j$, may be determined to be the words commonly included in the source language sentence $s_i$ and the translated sentence $s'_j$.

In such an example, the higher the importance level of each word commonly included in the source language sentence $s_i$ and the translated sentence $s'_j$, the greater the similarity between the source language sentence $s_i$ and the translated sentence $s'_j$. An importance level of a given word may be calculated based on the number of documents including the given word, a frequency of use of the given word, and the like. For example, an importance level of a particular word may be calculated based on a term frequency-inverse document frequency (TF-IDF). The tf-idf value increases in proportion to the number of times a particular word appears in the document and is offset by the number of documents in the corpus that contain that word, which helps to adjust for the fact that some words appear more frequently in general in a given language, without necessarily indicting that such words are actually important words. However, examples of calculation of such an importance level are not limited to the example described in the foregoing, and thus various other methods may be used to calculate the importance level of words, as appropriate.

Figure 5:
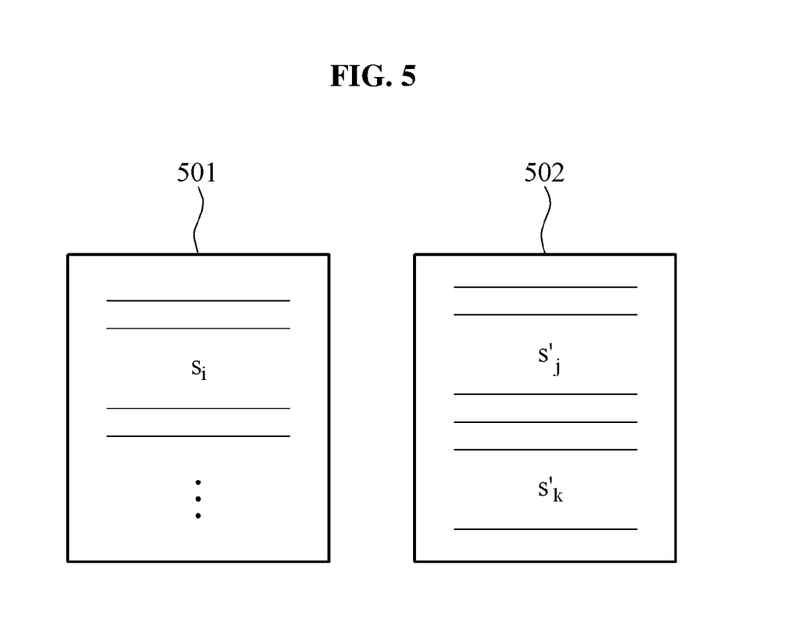
FIG. 5 is a diagram illustrating an example of how a similarity may be determined.

FIG. 5 is a diagram illustrating an example of how a similarity is determined.

Referring to the example of FIG. 5, the sentence mapping apparatus may determine a similarity between a source language sentence and a translated sentence based on (e.g., by comparing) a position of the source language sentence in a source language document 501 and a position of the translated sentence in a translated document 502. The more similar the position of the source language sentence and the position of the translated sentence, the greater the similarity between the source language sentence and the translated sentence. In an example, a position of a sentence in a document is determined based on either one or both of how many other sentences and/or words precede the sentence in the document.

In an example, the sentence mapping apparatus determines that a similarity between a position of a source language sentence $s_i$ and a position of a translated sentence $s'_j$ is greater than a similarity between the position of the source language sentence $s_i$ and a position of another translated sentence $s'_k$. Based on such a determination, the sentence mapping apparatus then determines that a similarity between the source language sentence $s_i$ and the determined translated sentence $s'_j$, is greater than a similarity between the source language sentence $s_i$ and the other translated sentence $s'_k$.

Figure 6:
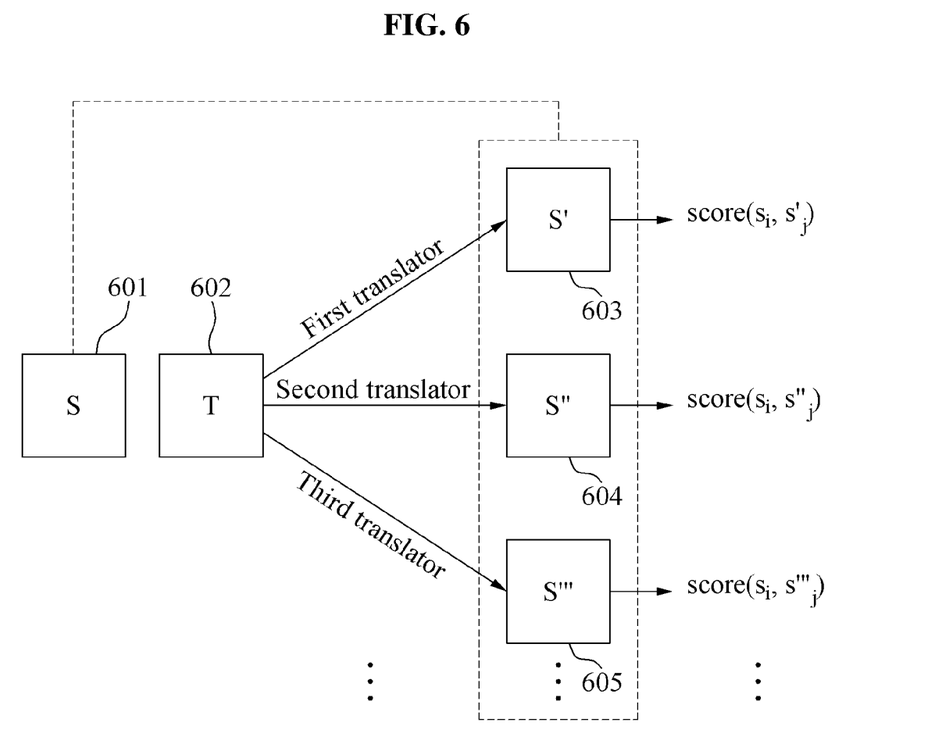
FIG. 6 is a diagram illustrating an example of how a similarity is determined.

FIG. 6 is a diagram illustrating an example of how a similarity is determined.

Referring to the example of FIG. 6, the sentence mapping apparatus obtains a target language document 602 from an initial translation of a source language document 601 into a target language. The sentence mapping apparatus translates the target language document 602 into a source language by each of several translators, and generates translated documents 603, 604, 605, . . . respectively corresponding to the translators. For example, FIG. 6 shows the use of three translators, but more or fewer translators may be used in other examples.

In an example, the sentence mapping apparatus may identify translated sentences, for example, $s'_j$, $s''_j$, $s'''_j$, and so on, from among translated sentences in the translated documents 603, 604, 605, respectively. The sentence mapping apparatus may determine similarities, for example, score($s_i$, $s'_j$), score($s_i$, $s''_j$), score($s_i$, $s'''_j$) . . . , between the source language sentence $s_i$ in the source language document 601 and the translated sentences $s'_j$, $s''_j$, $s'''_j$, . . . of the translators, respectively. The sentence mapping apparatus determines a similarity between the source language sentence $s_i$ and a jth translated sentence based on the similarities score($s_i$, $s'_j$), score($s_i$, $s''_j$), score($s_i$, $s'''_j$), . . . of the translators. For example, the sentence mapping apparatus determines the similarity between the source language sentence $s_i$ and the jth translated sentence using a statistical value of the similarities score($s_i$, $s'_j$), score($s_i$, $s''_j$), score($s_i$, $s'''_j$), . . . of the translators. For example, a greatest value or a representative value, for example, a mean value, of the similarities score($s_i$, $s'_j$), score($s_i$, $s''_j$), score($s_i$, $s'''_j$), . . . of the translators may be used or determined as the similarity.

Figure 7A:
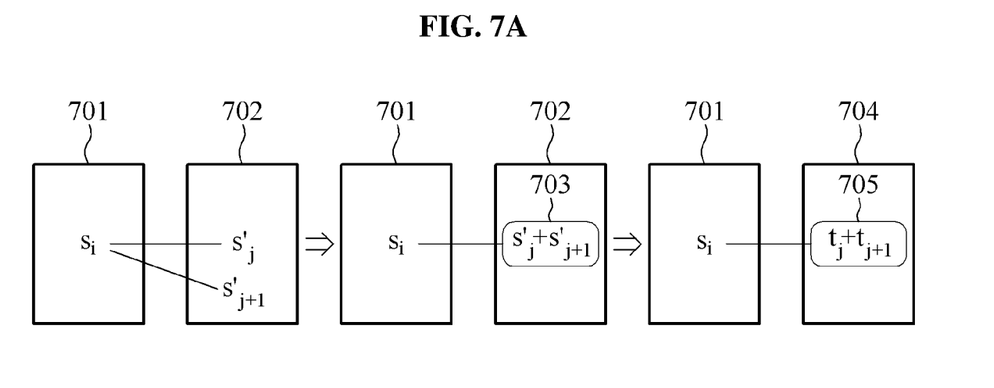
FIGS. 7A and 7B are diagrams illustrating examples of sentence mapping methods.

FIG. 7A is a diagram illustrating an example of a sentence mapping method.

Referring to the example of FIG. 7A, the sentence mapping apparatus may perform mapping based on similarities between source language sentences in a source language document 701 and corresponding translated sentences in a translated document 702. For example, as illustrated in FIG. 7A, when a source language sentence $s_i$ mapped to a translated sentence $s'_j$ is identical to a source language sentence $s_i$ mapped to a translated sentence $s'_{j+1}$, the sentence mapping apparatus may integrate the translated sentence $s'_j$ and the translated sentence s'$_{j+1}$ to form a single sentence s'$_j$+s'$_{j+1}$ 703. In such an example, the translated sentence s'$_j$ and the translated sentence s'$_{j+1}$ may be sentences positioned successively in the translated document 702.

Thus, the sentence mapping apparatus may map the source language sentence s$_i$ and the single sentence s'$_j$+s'$_{j+1}$ 703, accordingly. The sentence mapping apparatus maps the source language sentence s$_i$ with a target language sentence t$_j$+t$_{j+1}$ 705 in a target language document 704 corresponding to the single sentence s'$_j$+s'$_{j+1}$ 703. An example of integration of translated sentences using two translated sentences in successive order is described in the foregoing discussion of FIG. 7A. However, the number of translated sentences in successive order may increase beyond two translated sentences, according to another example.

Figure 7B:
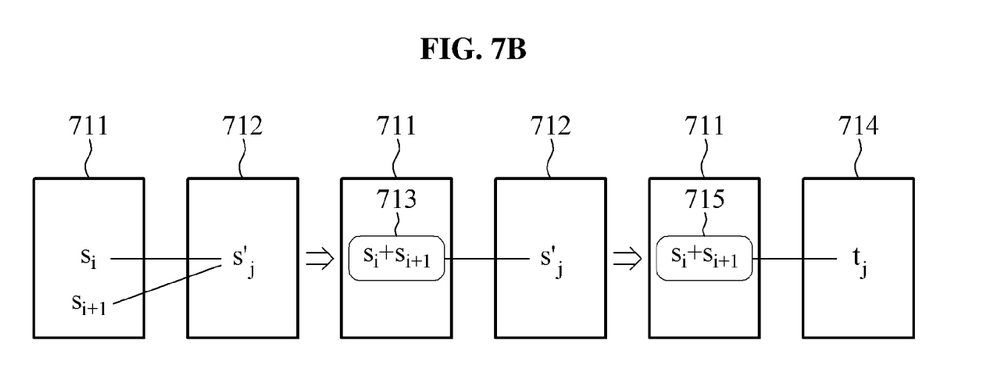

FIG. 7B is a diagram illustrating an example of a sentence mapping method.

Referring to the example of FIG. 7B, the sentence mapping apparatus may perform mapping based on similarities between source language sentences in a source language document 711 and corresponding translated sentences in a translated document 712. For example, as illustrated in FIG. 7B, when a translated sentence s'$_j$ mapped to a source language sentence s$_i$ is identical to a translated sentence s'$_j$ mapped to a source language sentence s$_{i+1}$, the sentence mapping apparatus integrates the source language sentence s$_i$ and the source language sentence s$_{i+1}$ to form a single sentence s$_i$+s$_{i+1}$ 713. In such an example, the source language sentence s$_i$ and the source language sentence s$_{i+1}$ may be sentences positioned successively in the source language document 711.

Thus, at this point in FIG. 7B, the sentence mapping apparatus may map the single sentence s$_i$+s$_{i+1}$ 713 and the translated sentence s'$_j$. Subsequently, the sentence mapping apparatus maps a source language sentence s$_i$+s$_{i+1}$ 715 and a target language sentence t$_j$ in a target language document 714 corresponding to the translated sentence s'$_j$. An example of integration of source language sentences using two source language sentences in successive order is described further in the foregoing discussion, such as in the discussion of FIG. 7A. However, the number of source language sentences in successive order may increase according to an example, as discussed above.

Figure 8:
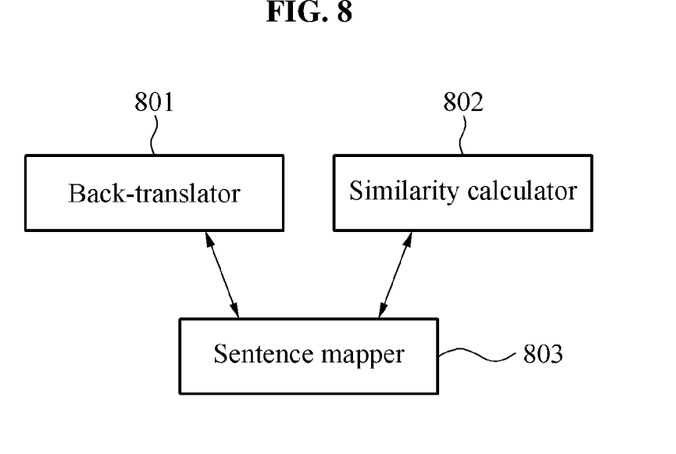
FIG. 8 is a diagram illustrating an example of a configuration of a sentence mapping apparatus.

FIG. 8 is a diagram illustrating an example of a configuration of a sentence mapping apparatus.

Referring to the example of FIG. 8, the sentence mapping apparatus may include a back-translator 801, a similarity calculator 802, and a sentence mapper 803. The back-translator 801 may be configured to translate a target language document into a source language. The similarity calculator 802 may be configured to calculate a similarity between a source language sentence and a translated sentence. The sentence mapper 803 may be configured to map the source language sentence and the translated sentence based on the similarity. The sentence mapper 803 may also be configured to map the source language sentence and a target language sentence corresponding to the mapped translated sentence.

Figure 9:
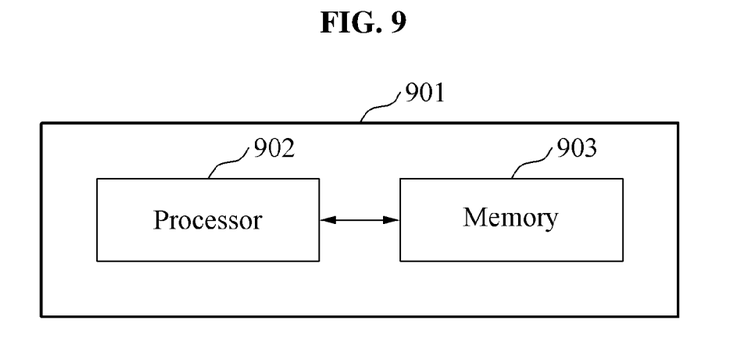
FIG. 9 is a diagram illustrating an example of a configuration of an apparatus.

FIG. 9 is a diagram illustrating an example of a configuration of an apparatus.

Referring to the example of FIG. 9, an apparatus 901 may include a processor 902 and a memory 903. For example, the apparatus 901 may be the sentence mapping apparatus described herein. The processor 902 may include one or more apparatuses, devices, or components described above with reference to FIGS. 1 through 8, and/or perform any one, any combination, or all operations or methods described above with reference to FIGS. 1 through 8. The memory 903 may store information associated with the sentence mapping method described herein, or store computing-base instructions through which the sentence mapping method may be implemented. The memory 903 may be a volatile memory or a nonvolatile memory.

The processor 902 may execute the instructions and control the apparatus 901. Instructions to be executed by the processor 902 may be stored in the memory 903. The apparatus 901 may be connected to an external device, for example, a personal computer (PC) and a network, through an input and output device, and exchange data with the external device.

The sentence mapping apparatus, as well as other apparatuses, units, modules, devices, and other components described herein with respect to FIGS. 8 and 9, such as training DB 203, translator 204, back-translator 801, similarity calculator 802, sentence mapper 803, processor 902, and memory 903 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented sentence mapping method comprising:
    obtaining a source language document in a source language and a target language document in a target language, wherein the target language document is a translation of the source language document;
    generating a translated document by translating the target language document into the source language; and
    mapping source language sentences in the source language document with target language sentences in the target language document by comparing the source language document and the translated document,
    wherein the mapping of the source language sentences and the target language sentences comprises:
    in response to a first source language sentence and a second source language sentence being mapped to a same translated sentence in the translated document, integrating the first source language sentence and the second source language sentence to form a single source language sentence; and
    mapping the single sentence with the translated sentence.

2. The method of claim 1, wherein the generating of the translated document comprises:
    generating translated sentences by translating each of the target language sentences in the target language document into the source language, one or more of the translated sentences corresponding to one or more respective target language sentences of the target language sentences.

3. The method of claim 1, wherein the mapping of the source language sentences with the target language sentences comprises:
    determining similarities between the source language sentences and translated sentences in the translated document;
    mapping the source language sentences with the translated sentences based on the similarities; and
    mapping the source language sentences with target language sentences of the target language sentences respectively corresponding to the mapped translated sentences.

4. The method of claim 1, wherein the mapping of the source language sentences and the target language sentences comprises:
    identifying a source language sentence of the source language sentences;

determining a similarity between the identified source language sentence and each of translated sentences in the translated document; and mapping the identified source language sentence and a translated sentence of the translated sentences having a greatest similarity among the determined similarities.

5. The method of claim 4, wherein the determining of the similarity comprises:

identifying a translated sentence of the translated sentences; and determining a similarity between the identified source language sentence and the identified translated sentence based on an importance level of at least one word commonly included in the identified source language sentence and the identified translated sentence.

6. The method of claim 5, wherein the determining of the similarity comprises:

extracting the at least one word commonly included in the identified source language sentence and the identified translated sentence using either one or both of a synonym dictionary and a thesaurus of the source language.

7. The sentence mapping method of claim 5, wherein a word included in the identified translated sentence that is a synonym of a word included in the identified source language sentence is determined to be the commonly included word.

8. The method of claim 5, wherein the importance level of the at least one word is calculated based on a term frequency-inverse document frequency (TF-IDF) of the at least one word.

9. The method of claim 4, wherein the determining of the similarity comprises:

identifying a translated sentence of the translated sentences; and determining a similarity between the identified source language sentence and the identified translated sentence based on a position of the identified source language sentence in the source language document and a position of the identified translated sentence in the translated document.

10. The method of claim 4, wherein the determining of the similarity comprises:

identifying a translated sentence of the translated sentences; and determining a similarity between the identified source language sentence and the identified translated sentence based on a probability of the identified source language sentence being generated when a target language sentence corresponding to the identified translated sentence is translated into the source language.

11. The method of claim 4, wherein the generating of the translated document comprises:

generating a plurality of translated documents by translating the target language document into the source language by each of a plurality of translators, and the determining of the similarity comprises identifying a translated sentence of the translated sentences for each of the translated documents, determining a similarity between the identified source language sentence and each of the identified translated sentences for each of the translated documents, and determining a similarity between the identified source language sentence and the identified translated sentence based on the determined similarities.

12. The method of claim 1, wherein the first source language sentence and the second source language sentence are in succession in the source language document.

13. A processor-implemented sentence mapping method comprising:

obtaining a source language document in a source language and a target language document in a target language, wherein the target language document is a translation of the source language document;

generating a translated document by translating the target language document into the source language; and mapping source language sentences in the source language document with target language sentences in the target language document by comparing the source language document and the translated document, wherein the mapping of the source language sentences and the target language sentences comprises:

in response to a first translated sentence and a second translated sentence in the translated document being mapped to a same source language sentence of the source language sentences, integrating the first translated sentence and the second translated sentence to form a single translated sentence; and mapping the single translated sentence with the source language sentence.

14. The method of claim 13, wherein the first translated sentence and the second translated sentence are in succession in the translated document.

15. A non-transitory computer-readable storage medium storing instructions that, when executed by one or more processors, cause the one or more processors to perform the method of claim 1.

16. A sentence mapping apparatus comprising:

one or more processors configured to obtain a source language document in a source language and a target language document in a target language, wherein the target language document is a translation of the source language document, generate a translated document by translating the target language document into the source language, and map source language sentences in the source language document with target language sentences in the target language document by comparing the source language document and the translated document, wherein, for the mapping of the source language sentences and the target language sentences, the one or more processors are configured to:

in response to a first source language sentence and a second source language sentence being mapped to a same translated sentence in the translated document, integrating the first source language sentence and the second source language sentence to form a single source language sentence; and mapping the single sentence with the translated sentence.

17. The apparatus of claim 16, wherein the one or more processors are further configured to:

identify a source language sentence of the source language sentences;

determine a similarity between the identified source language sentence and each of translated sentences in the translated document; and map the identified source language sentence and a translated sentence of the translated sentences having a greatest similarity among the determined similarities.

18. The apparatus of claim 16, wherein the one or more processors are further configured to:

identify a translated sentence of the translated sentences; and determine a similarity between the identified source language sentence and the identified translated sentence based on an importance level of at least one word commonly included in the identified source language sentence and the identified translated sentence.

19. The apparatus of claim 16, wherein the processor is further configured to:

identify a translated sentence of the translated sentences; and determine a similarity between the source language sentence and the identified translated sentence based on a position of the source language sentence in the source language document and a position of the translated sentence in the translated document.

20. The apparatus of claim 16, wherein the one or more processors are further configured to:

translate the target language document into the source language by each of translators, and generate translated documents respectively corresponding to the translators;

identify one of the translated sentences;

determine a similarity between the source language sentence and the identified translated sentence for each of the translators; and determine a similarity between the source language sentence and the translated sentence based on the similarity determined for each of the translators.

21. A sentence mapping method comprising:

obtaining a source language document comprising sentences in a source language;

obtaining a target language document comprising sentences in a target language, wherein the target language document is a translation of the source document in the target language;

translating the target language document into a translated document comprising sentences in the source language;

mapping the sentences in the source language document with the sentences in the target language document by comparing the source language document and the translated document; and constructing a training database using a result of the mapping between the sentences in the source language document with the sentences in the target language document, wherein the mapping of the sentences in the source language document and the sentences in the target language document comprises:

in response to a first sentence and a second sentence in the source language document being mapped to a same translated sentence of the sentences in the target language document, integrating the first sentence and the second sentence to form a single source language sentence; and mapping the single source language sentence with the translated sentence.

22. The sentence mapping method of claim 21, further comprising:

training a translator using the training database.

23. The sentence mapping method of claim 21, further comprising:

generating a parallel corpus using the training database.

24. The method of claim 1, wherein the mapping of the source language sent ences and the target language sentences comprises:

in response to a first translated sentence and a second translated sentence in the translated document being mapped to a same source language sentence of the source language sentences, integrating the first translated sentence and the second translated sentence to form a single translated sentence; and mapping the single translated sentence with the source language sentence.

25. The method of claim 24, wherein the first translated sentence and the second translated sentence are in succession in the translated document.

26. A sentence mapping apparatus comprising:

one or more processors configured to:

obtain a source language document in a source language and a target language document in a target language, wherein the target language document is a translation of the source language document;

generate a translated document by translating the target language document into the source language; and map source language sentences in the source language document with target language sentences in the target language document by comparing the source language document and the translated document, wherein, for the mapping of the source language sentences and the target language sentences, the one or more processors are configured to:

in response to a first translated sentence and a second translated sentence in the translated document being mapped to a same source language sentence of the source language sentences, integrating the first translated sentence and the second translated sentence to form a single translated sentence; and mapping the single translated sentence with the source language sentence.

* * * * *